July 21, 1942.  L. L. PHILLIPS  2,290,706
CABLE JOINT AND METHOD OF MAKING THE SAME
Filed June 29, 1940
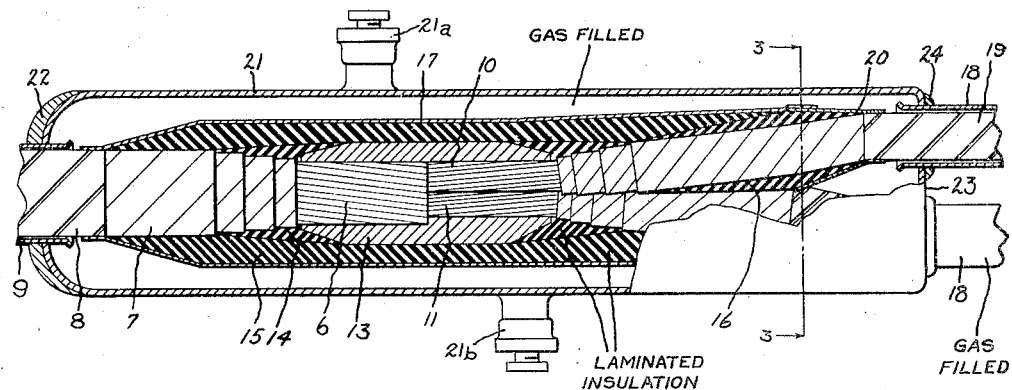
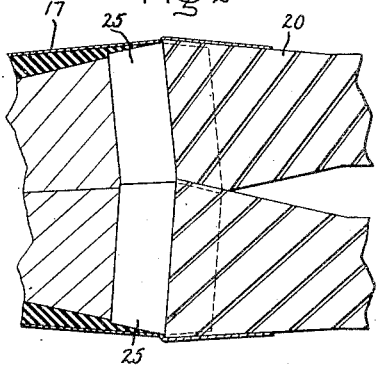
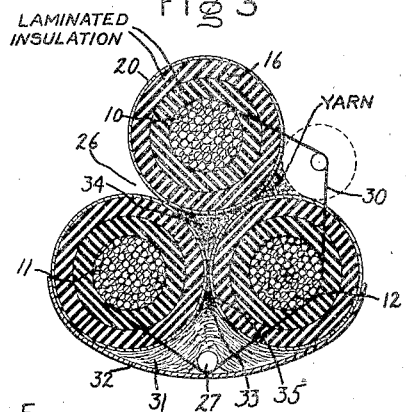
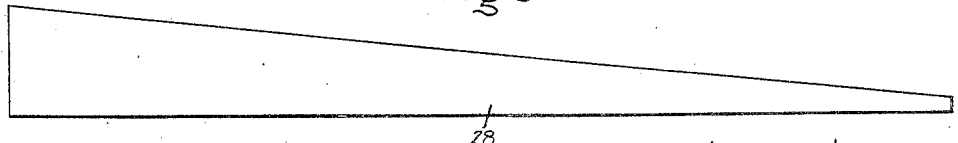
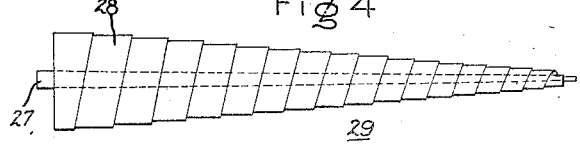
Inventor:
Lester L. Phillips,
by Harry E. Dunham
His Attorney.

Patented July 21, 1942

2,290,706

UNITED STATES PATENT OFFICE 2,290,706

CABLE JOINT AND METHOD OF MAKING THE SAME

Lester L. Phillips, Pittsfield, Mass., assignor to General Electric Company, a corporation of New York Application June 29, 1940, Serial No. 343,211

10 Claims. (Cl. 174—71)

The present invention relates to multi-conductor cable joints and especially to such joints for use in gas filled cables.

In jointing multi-conductor cables, the ends of the conductors of adjacent lengths are necessarily spread apart or splayed after which the ends of corresponding conductors are united by metal connectors which may be soldered to the conductors or secured thereto by pressing operations. Over each connector and the ends of the connected conductors is wrapped by hand a sufficient and substantial amount of insulating material to properly insulate each connector and the cable ends from ground. When the work is completed, the conductors and their coverings define axially diverging spaces with relatively large peripheral areas of generally triangular form between each pair of adjacent conductors. These relatively large areas are objectionable and particularly so in a low pressure gas filled cable for the reason that the gas filling between parts of the joint at the low pressure employed is not as good an insulating medium per unit of thickness as the wrapped on material and hence these areas under operating conditions are or may be a source of weakness.

An object of my invention is the provision of an improved cable joint or structure, and especially for cables utilizing a filling of low pressure gas as a part of the insulation and one wherein the weakness above referred to is avoided.

Another object of my invention is an improved method of applying insulation to cables where the individual conductors have portions which are separated by diverging spaces.

For a consideration of what I believe to be novel and my invention, attention is directed to the accompanying description and claims appended thereto.

In the accompanying drawing, which is illustrative of my invention, Fig. 1 is a longitudinal sectional view of a cable joint; Fig. 2 is a detail view of a part of the joint; Fig. 3 is a partial cross-section of a joint taken on line 3—3 of Fig. 1; Fig. 4 is a detail view of one of the preformed fillers, and Fig. 5 is a detail view of the sheet material used in making a filler.

I have elected to show my invention in connection with a cable joint wherein a single large conductor is arranged to supply current to three smaller branch conductors, since the problems involved in splicing them are somewhat greater than with other types of joints, but my invention is not limited thereto.

6 indicates the conductor of a single conductor cable having a covering 7 of insulation made of paper tape applied layer by layer and subsequently impregnated with a compound, 8 an electrostatic shield of any suitable construction, and 9 an enclosing impervious sheath made of lead or equivalent material. The cable may be of the solid, gas filled or other type. 10, 11 and 12 indicate the stranded conductors of three gas filled branch cables which receive current from the conductor 6 through the metal connector 13, the latter having a single opening for the conductor 6 at one end and an opening at the other end to receive the three branch conductors. The connector may be sweated to the conductors or pressed thereon. The conductors as usual are covered with compound impregnated insulation, such as laminated paper, the compound being of such character that it is retained therein by capillary action.

Over the connector 13 and adjacent diverging cable ends are wrappings 14 and 15 of insulating fabric tape wound in place layer by layer. Each of the three conductors is also provided with similarly applied reinforcing fabric tape 16 which is partly overlaid by the wrapping 15. Over the wrappings 15 and 16 is an electrostatic shield made of metallic braid 17 which is smoothly and tightly applied. Subsequently, the turns of the braid are soldered together to hold them in their proper positions. As will be seen, the braid 17 not only surrounds the single conductor but the three diverging conductors as well, thereby effecting a complete shielding of the parts. The three right hand or branch conductors are each enclosed in a metallic sheath 18 containing gas, such as nitrogen, under low positive pressure, of which 10 to 15 pounds per square inch is an example, there being suitable channels within the sheath for conveying the gas. Each of the three conductors has an electrostatic shield 19 of which thin sheet copper is an illustration. Each of the reinforcements 16 is also provided with a metallic shield 20 of conical form which is overlapped by the braid covering 17.

The joint is enclosed in a chambered metallic casing 21 which is wipe soldered at 22 to the sheath 9. The right hand end of the casing has a perpendicular wall 23 which has as many openings as there are branch cables, the sheaths of which are soldered at 24 to the wall. The casing is provided with a fitting 21a for admitting gas, and a fitting 21b by means of which impregnating compound may be drained therefrom.

In the region where the individual diverging conductors pass out from under the wrappings 15 and braid 17, there is considerable electric stress and for the purpose of reducing it, each of the individual conductors has or may have a wrapping of suitably metalized tape 25 located under the individual tape coverings or reinforcements. As an example, the tape may be made of fabric containing sufficient metallic material to make it semi-conducting. A suitable tape for the purpose is one coated or impregnated with a metallic paint.

As will be evident, especially from Fig. 3, there are peripheral open spaces or areas 26 of substantially triangular form in cross-section and diverging outwardly which normally would be completely filled with gas under pressure from the three cables as well as that in the chamber of the casing. Since low pressure gas is not as effective as an insulating medium in relatively large spaces as impregnating material, special preformed filler means are employed to reduce the size of the free spaces, especially at the peripheral portions of the conductor coverings where the stress is greatest.

The fillers are constructed as follows. A mandrel of insulation 27, such as oil soaked wood, is employed over which is wound high grade insulation such as varnished cambric 28. Desirably the mandrel is or may be tapered slightly from end to end. The spaces to be filled gradually enlarge or diverge from a small area on the connector side toward the right hand end of the casing. To give the fillers the desired initial conical shape, a sheet of varnished cambric is cut to the form shown in Fig. 5, that is to say wide at one end and tapering gradually toward the other end. As an example of one joint made in accordance with my invention, the sheet is 64 inches in length, 7½ inches wide at the base end and 1 inch wide at the opposite end. After the sheet is wound on the mandrel 27, the result is a relatively short conical body or member 29 such as shown in Fig. 4. In this illustration, it is 7½ inches long and approximately one inch in diameter at the large end. The tapered or conical bodies or members are pushed individually into the spaces between the conductor coverings. A cord or cords 30 is then wrapped around the outer ends of the mandrels 27 and over some fixed part of the joint temporarily to hold the large ends of the members in place, for example as shown in dotted lines in Fig. 3. The inner ends are held in position by the conductor coverings. After the members are properly held in position, the layers of cambric of each filler are cut down to the mandrel by means of a suitable tool such as a knife, which permits the turns to unroll, spread, or open out as indicated at 31 after which a binding is applied that has the effect of forcing the free parts of the cut turns into engagement with the conductor coverings and also to push or wedge some of the material inward as at 33 toward the region of contact between adjacent conductor coverings. The tape winding 15 forms such a binding. It is to be noted that the winding performs three functions, that of insulating the conducting parts, binding them in their adjusted positions and holding the preformed spacers in position. Where the large ends of the fillers extend somewhat beyond the end of the winding 15, an additional binding such as 32 is applied. This may be taken as a turn of the metallic shielding braid 17 or as a wrapping of insulating tape. As a result of the cutting operation and the binding, each conical member is transformed into a member of substantially triangular shape in cross-section, large at one end and tapering to a small cross-sectional area at the other, thereby conforming approximately to the spaces to be filled. The mandrel, it will be noted, serves as a means for holding the cut turns in place.

When the small ends of the preformed fillers are wedged into the spaces between conductor coverings and are therefore relatively inaccessible, the cutting of the turns may be limited to the fully exposed portions. In some instances, it may be desirable not to have the turns of the sheet at the small end of the filler in firm contact with the mandrel but slightly spaced therefrom so that the small ends will have considerable flexibility or elasticity and can therefore be more easily wedged into and more completely fill the portions of the crotch spaces of small area between conductor coverings. A slight tapering of the mandrel will assist in this particular.

As an additional measure of protection, the center space between conductor coverings is filled with packed yarn 34. Similarly, the smaller portions of the peripheral spaces 26 are also filled with packed yarn 35. When the fillers are finally secured in place, the yarn 35 is given additional compression pressure by the fillers so as to eliminate as fully as possible even small spaces in these areas. As a final result, what would otherwise be empty spaces later filled with gas are filled with effective solid insulating material. It is only in the outer portions of the spaces that the electrical stresses are especially high and as will be seen these are completely filled with solid material to the exclusion of relatively large gas bodies.

Although my invention has been described in connection with one type of cable joint, it is evident that it is applicable to other types of cable joints irrespective of the character of the cables themselves. The fillers have the advantage that they are small and easily installed, are effective for their purpose, are factory made which ensures uniformity, and being small can be enclosed in the same carton sent to the customer with other materials for cable jointing. The fillers being made of fabric are somewhat elastic when cut which permits of their being forced into firm engagement with conductor coverings, even though the latter do not have exactly true surfaces. By using sheet material of the form illustrated in Fig. 5, the advantage of simplicity of manufacture is obtained, it being easier to wind a tapered sheet to form a cone shaped body than to wind a narrow tape for the purpose. Experience in cable work has amply demonstrated that varnished cambric is a high grade insulating medium and for that reason, it is desirable to use it in making the fillers but my invention is not necessarily limited thereto.

As will be noted from the foregoing description, the primary purpose of my improved construction is to provide preshaped fillers which are capable of largely or completely filling the spaces between diverging conductor coverings in joints where the electrical stresses are or tend to be higher during operating conditions than at other parts.

Many of the same conditions exist in terminal structures as in cable joints, and in some cases it will be found useful to use the short tapered fillers in such structures, as for example where three conductors located in the same sheath are splayed or spaced apart where they pass through the terminal casing. In such an arrangement, there are wedged shaped or diverging spaces between conductor coverings.

In a so-called "normal" joint where the ends of three conductors having 120 degree relation are joined to the ends of three other conductors, a view in cross-section will be similar to that shown in Fig. 3 so for the purposes hereof, this figure may be taken as also representative of a section of a normal joint for three conductor cables.

While my invention is described in connection with cables utilizing gas under relatively low pressure, it is also applicable to cables using gas at much higher pressures.

What I claim as new and desire to secure by Letters Patent of the United States is:

1. A cable structure comprising insulated sheathed conductors so assembled as to have diverging spaces at their ends between their respective coverings, individual preformed cone shaped insulators made of layers of fibrous material located in and substantially filling the diverging crotch spaces and engaging the conductor coverings, a binding for wedging the preformed insulators into place between the conductor coverings and thereafter holding them in such position, and a casing which encloses the insulators and the binding.

2. A cable joint comprising insulated conductors, some of which are so assembled that peripheral axially diverging spaces are formed between them, connector means uniting adjacent ends of the conductors, insulation covering the connector means and the end portions of the conductors located therein, reinforcing tape of conical form applied to the diverging portions of the conductors, and individual unitary tapered fillers of insulation located in the peripheral spaces, a portion of each filler being located in the space under the insulation covering in engagement with the reinforcing tape.

3. A cable joint comprising insulated conductors, some of which are so assembled that peripheral axially diverging spaces are formed between them, connector means uniting adjacent ends of the conductors, laminated wrapped insulation covering the connector means and also the end portions of the conductors located therein, and individually applied unitary fillers of laminated insulation located in the peripheral spaces which are partly surrounded by the insulation covering and held in place thereby, the remainder of the fillers having cut portions engaging the insulated conductors beyond said covering.

4. A cable joint comprising insulated conductors, some of which are so assembled that peripheral axially diverging spaces are formed between them, connector means uniting adjacent ends of the conductors, insulation covering the connector means and the end portions of the conductors located therein, and separately applied unitary fillers located in the peripheral spaces, each filler comprising a wrapped body of sheet insulating material initially forming a cone which is split on one side of its longitudinal axis.

5. A cable joint comprising insulated conductors, some of which are so assembled that peripheral spaces are formed between them, connector means uniting adjacent ends of the conductors, insulation covering the connector means and the end portions of the conductors located therein, fillers located in the peripheral spaces, each filler comprising a body of wound layers of sheet insulating material cut axially to permit separation of the layers on one side of its axis, and a binding surrounding the bodies and pressing them and the cut ends inwardly toward the axis of the joint and into engagement with the conductor coverings.

6. A cable joint comprising insulated conductors, some of which are so assembled that peripheral diverging spaces are formed between them, connector means uniting adjacent ends of the conductors, insulation covering the connector means and the ends of the conductors located therein, fillers located in the peripheral spaces, each filler comprising a mandrel over which is wound layers of insulating material to form a short cone, the layers thereof being cut axially to one side of the mandrel to permit the turns to separate, and a binding engaging the cut ends of the layers and forcing the fillers inwardly toward the axis of the joint.

7. A cable joint comprising three conductors having diverging ends in 120° spaced relation and insulating coverings in contact with one another, there being a central and peripheral spaces between the conductor coverings, a filling of packed yarn for the central space, partial fillings of packed yarn for the peripheral spaces, preformed bodies of cone shaped insulating material each split on one side of its longitudinal axis located in the peripheral spaces and substantially filling them, and a binding for holding the bodies in their respective positions with the cut portion of each body in engagement with the insulated coverings of the two conductors and causing the bodies to compress the yarn which is directly under them.

8. The method of insulating cable assemblies wherein there are diverging peripheral spaces between the insulating coverings of adjacent conductors which comprises inserting cone-shaped bodies of wound laminated insulating material in the said spaces, partially cutting each of the bodies axially in a manner to permit turns thereof to open or spread, and enclosing the conductor coverings and the spreaded turns of the bodies with a binding to hold the parts in place.

9. The method of additionally insulating cables wherein there are diverging peripheral spaces between the insulating coverings of adjacent conductors which comprises filling the spaces with sheet insulation wound to form conical bodies, temporarily holding the bodies in place, cutting the material of each of the bodies longitudinally to approximately the axis thereof to permit turns thereof to open or spread, and wrapping the conductors and cut bodies with a binding in a manner to engage the cut turns of the bodies and force the turns and bodies inwardly toward the axis of the assembled cables.

10. The method of insulating a joint for three-conductor cables having diverging ends which comprises inserting preformed tapered bodies in the form of insulating material spirally wrapped around insulating mandrels in the spaces between the diverging conductors, temporarily holding the bodies in their respective positions by means applied over the outer ends of the mandrels, cutting the bodies longitudinally approximately to the mandrel to permit the cut portions thereof to spread, and applying an enclosing band common to the bodies to squeeze them into place between conductors.

LESTER L. PHILLIPS.